(12) United States Patent
Matias et al.

(10) Patent No.: US 10,129,464 B1
(45) Date of Patent: Nov. 13, 2018

(54) USER INTERFACE FOR CREATING COMPOSITE IMAGES

(71) Applicant: GOPRO, INC., San Mateo, CA (US)

(72) Inventors: Joven Matias, Encinitas, CA (US); Daryl Stimm, Encinitas, CA (US); Ryan Lustig, Encinitas, CA (US); Kyler Schwartz, Valley Center, CA (US); Joseph VanDalsem, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/436,639

(22) Filed: Feb. 17, 2017

Related U.S. Application Data

(60) Provisional application No. 62/296,976, filed on Feb. 18, 2016.

(51) Int. Cl.
*H04N 5/232* (2006.01)

(52) U.S. Cl.
CPC ..... *H04N 5/23229* (2013.01); *H04N 5/23203* (2013.01); *H04N 5/23216* (2013.01); *H04N 5/23245* (2013.01); *H04N 5/23293* (2013.01)

(58) Field of Classification Search
CPC .................................................. H04N 5/23229
USPC ........................ 348/208.14, 211.2; 382/107
See application file for complete search history.

(56) References Cited

U.S. PATENT DOCUMENTS 6,514,081 B1 * 2/2003 Mengoli ............ A63B 24/0003
434/252

| | | |
|---|---|---|
| 6,633,685 B1 | 10/2003 | Kusama |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,606,073 B2 | 12/2013 | Woodman |

(Continued)

FOREIGN PATENT DOCUMENTS

| JP | H09181966 A | 7/1997 |
|---|---|---|
| JP | 2005252459 A | 9/2005 |

(Continued)

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

(Continued)

*Primary Examiner* — Usman A Khan
(74) *Attorney, Agent, or Firm* — Sheppard Mullin Richter & Hampton LLP

(57) ABSTRACT

Systems and methods for image compositing. Image capture devices may be used for documenting various activities. An image capture device may be configured to operate in image acquisition mode configured for image compositing. The image acquisition mode may be characterized by one or more of a given image acquisition interval, number of acquired images, camera shutter setting, and/or other settings. The image capture device may provide a user interface configured to facilitate acquiring an image sequence suitable for compositing. A live compositing preview may enable users to select one or more composite images for viewing and/or sharing.

20 Claims, 9 Drawing Sheets

(56) References Cited

U.S. PATENT DOCUMENTS

| | | |
|---|---|---|
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,142,257 B2 | 9/2015 | Woodman |
| 9,342,376 B2 | 5/2016 | Jain |
| 9,418,283 B1 | 8/2016 | Natarajan |
| 2002/0165721 A1 | 11/2002 | Chang |
| 2003/0179294 A1* | 9/2003 | Martins .................. G01S 3/781 348/157 |
| 2004/0001706 A1 | 1/2004 | Jung |
| 2004/0096085 A1* | 5/2004 | Matsumoto ........ A63B 24/0003 382/107 |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2006/0284976 A1* | 12/2006 | Girgensohn ...... G06F 17/30811 348/135 |
| 2008/0123976 A1 | 5/2008 | Coombs |
| 2008/0183843 A1 | 7/2008 | Gavin |
| 2009/0015678 A1* | 1/2009 | Hoogs ...................... G06T 7/20 348/207.1 |
| 2009/0019995 A1 | 1/2009 | Miyajima |
| 2009/0027499 A1 | 1/2009 | Nicholl |
| 2009/0125559 A1 | 5/2009 | Yoshino |
| 2009/0252474 A1 | 10/2009 | Nashida |
| 2010/0046842 A1 | 2/2010 | Conwell |
| 2010/0086216 A1 | 4/2010 | Lee |
| 2010/0161720 A1 | 6/2010 | Colligan |
| 2010/0199182 A1 | 8/2010 | Lanza |
| 2010/0274714 A1 | 10/2010 | Sims |
| 2010/0318660 A1 | 12/2010 | Balsubramanian |
| 2011/0051816 A1* | 3/2011 | Kitamura ............. H04N 19/139 375/240.24 |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0242130 A1* | 10/2011 | Toba ........................ G06T 11/00 345/629 |
| 2012/0014673 A1 | 1/2012 | O'Dwyer |
| 2012/0027381 A1 | 2/2012 | Kataoka |
| 2012/0030263 A1 | 2/2012 | John |
| 2012/0062732 A1* | 3/2012 | Marman .................. H04N 7/18 348/142 |
| 2012/0106869 A1* | 5/2012 | Machitani .......... H04N 5/23254 382/284 |
| 2012/0141019 A1 | 6/2012 | Zhang |
| 2012/0210205 A1 | 8/2012 | Sherwood |
| 2012/0210228 A1 | 8/2012 | Wang |
| 2012/0246114 A1 | 9/2012 | Edmiston |
| 2012/0269444 A1* | 10/2012 | Naito .................. H04N 5/23229 382/197 |
| 2012/0283574 A1 | 11/2012 | Park |
| 2013/0182166 A1 | 7/2013 | Shimokawa |
| 2013/0202158 A1* | 8/2013 | Nakao ...................... G06T 7/20 382/107 |
| 2013/0235071 A1 | 9/2013 | Ubillos |
| 2013/0239051 A1 | 9/2013 | Albouze |
| 2013/0330019 A1 | 12/2013 | Kim |
| 2014/0149865 A1 | 5/2014 | Tanaka |
| 2014/0152762 A1 | 6/2014 | Ukil |
| 2014/0282661 A1 | 9/2014 | Martin |
| 2015/0039646 A1 | 2/2015 | Sharifi |
| 2015/0071547 A1 | 3/2015 | Keating |
| 2015/0113009 A1 | 4/2015 | Zhou |
| 2015/0156247 A1 | 6/2015 | Hensel |
| 2015/0287435 A1 | 10/2015 | Land |
| 2016/0029105 A1 | 1/2016 | Newman |
| 2016/0094601 A1 | 3/2016 | Besehanic |
| 2016/0103830 A1 | 4/2016 | Cheong |
| 2016/0189752 A1 | 6/2016 | Galant |
| 2016/0260000 A1 | 9/2016 | Yamakawa |
| 2016/0286235 A1 | 9/2016 | Yamamoto |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Japanese Office Action for JP Application No. 2013-140131, dated Aug. 5, 2014, 6 pages.

Office Action for U.S. Appl. No. 13/831,124, dated Mar. 19, 2015, 14 pages.

PSonar URL: http://www.psonar.com/about retrieved on Aug. 24, 2016, 3 pages.

PCT International Search Report and Written Opinion for PCT/US2015/023680, dated Oct. 6, 2015, 13 pages.

PCT International Written Opinion for PCT/US2015/041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

\* cited by examiner

USER INTERFACE FOR CREATING COMPOSITE IMAGES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image and/or video content and more particularly in one exemplary aspect to image compositing.

Description of Related Art

Image compositing may be used in order to describe an activity wherein an object may move across an image frame. Conventional image capture techniques may prove inadequate when capturing images for compositing applications.

SUMMARY

One aspect of the disclosure relates to image compositing. A user interface may be presented on a display. The user interface may include a field related to a compositing image acquisition mode. Responsive to a selection of the field related to the compositing image acquisition mode by a user, one or more instructions may be communicated to a capture device via a wireless communications interface. The instruction(s) may be configured to cause the capture device to acquire a sequence of images. One or more composite images may be generated based on two or more images from the sequence of images. Two or more images from the sequence of images may individually include a representation of an object captured at different points in time. The composite image(s) may include multiple representations of the object captured at different points in time. The composite image(s) may be presented via the user interface.

A system for image compositing may include one or more physical processors and/or other components. The processor(s) may be configured by machine-readable instructions. Executing the machine-readable instructions may cause the processor(s) to facilitate image compositing.

The processor(s) may be configured to effectuate presentation of a user interface and/or other information on a display. The user interface may include one or more fields related to one or more image acquisition modes. One or more image acquisition modes may include a compositing image acquisition mode and/or other image acquisition modes.

The processor(s) may be configured to, responsive to receiving a selection of the field related to the compositing image acquisition mode, communicate to a capture device one or more instructions. The processor(s) may communicate via a wireless communications interface and/or other communications interface. The instruction(s) may be configured to cause the capture device to acquire a sequence of images and/or other information. In some implementations, the sequence of images may be some or all of the video frames of a video clip acquired by the capture device.

In some implementations, the processor(s) may be configured to provide via the user interface one or more instructions related to operation of the capture device for acquiring the sequence of images. In some implementations, the processor(s) may be configured to provide via the user interface one or more options configured to cause the capture device to capture the sequence of images, set a capture duration for the sequence of images, set a number of images within the sequence of images, set an inter-image interval, set a shutter speed, set a resolution for the sequence of images, and/or to perform some other operation(s).

The processor(s) may be configured to obtain one or more composite image. The composite image(s) may be generated based on two or more images from the sequence of images and/or other information. Individual ones of the two or more images may include a representation of an object captured at different points in time and/or other information. Individual ones of the composite image(s) may include multiple representations of the object captured at different points in time.

In some implementations, the composite image(s) may be generated by the capture device. In some implementations, the composite image(s) may be generated by the processor(s) of the system.

In some implementations, the one or more composite images are generated based on a given overlap amount between the multiple representations of the object. For example, the composite images may include a first composite image, a second composite image, and/or other composite images. The first composite image may be generated based on a first overlap amount between the multiple representations of the object and/or other information. The second composite image may be generated based on a second overlap amount between the multiple representations of the object and/or other information. The first overlap amount may be different from the second overlap amount.

The processor(s) may be configured to present one or more of the obtained composite image(s) via the user interface. In some implementations, the user interface includes a slider and/or other information. The slider may enable user selection of a given overlap amount between the multiple representations of the object. In some implementations, responsive to user selection of a given overlap amount between the multiple representations of the object, a composite image may be generated based on the given overlap amount between the multiple representations of the object. In some implementations, responsive to user selection of a given overlap amount between the multiple representations of the object, a composite image may be presented via the user interface. The presented composite image may have been generated based on the given overlap amount between the multiple representations of the object.

In some implementations, the processor(s) may be configured to communicate one or more of the obtained composite images to a target destination via the wireless interface.

One aspect of the disclosure relates to a user interface device for sharing composite image(s). A sequence of images may be accessed. A foreground portion and a background portion for two or more images of the sequence of images may be determined. Multiple representations of an object in the foreground portions of the two or more images may be identified. One or more composite images may be generated based on one or more of the background portions and the multiple representations of the object in the foreground portions of the two or more images. One or more of the generated composite images may be presented on the display. A selection of at least one of the generated composite image(s) for sharing may be received. The selected composite image(s) may be provided to a target destination via the wireless communication interface.

A user interface device may include a display, a wireless communications interface, one or more physical processors and/or other components. The processor(s) may be configured by machine-readable instructions. Executing the machine-readable instructions may cause the processor(s) to facilitate operations of the user interface device.

The processor(s) may be configured to access a sequence of images and/or other information. In some implementations, accessing the sequence of images may include accessing previously acquired images. In some implementations, accessing the sequence of images may include communicating to a capture device one or more instructions configured to cause the capture device to acquire the sequence of images; and obtaining the sequence of images from the capture device.

The processor(s) may be configured to determine a foreground portion and a background portion for two or more images of the sequence of images. The processor(s) may be configured to identify multiple representations of an object in the foreground portions of the two or more images.

The processor(s) may be configured to generate one or more composite images based on one or more of the background portions, the multiple representations of the object in the foreground portions of the two or more images, and/or other information. In some implementations, the composite image(s) may be generated further based on a given overlap amount between the multiple representations of the object and/or other information. For example, the composite images may include a first composite image, a second composite image, and/or other composite images. The first composite image may be generated based on a first overlap amount between the multiple representations of the object and/or other information. The second composite image may be generated based on a second overlap amount between the multiple representations of the object and/or other information. The first overlap amount may be different from the second overlap amount.

The processor(s) may be configured to effectuate presentation on the display one or more of the generated composite images and/or other information. In some implementations, the processor(s) may be configured to effectuate presentation of a slider on the display. The slider may enable user selection of a given overlap amount between the multiple representations of the object. In some implementations, responsive to user selection of a given overlap amount between the multiple representations of the object, a composite image may be generated based on the given overlap amount between the multiple representations of the object. In some implementations, responsive to user selection of a given overlap amount between the multiple representations of the object, a composite image may be presented via the user interface. The presented composite image may have been generated based on the given overlap amount between the multiple representations of the object.

The processor(s) may be configured to receive a selection of at least one of the generated composite images for sharing. The processor(s) may be configured to provide the selected composite image to a target destination via the wireless communications interface.

All Figures disclosed herein are © Copyright 2017 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations are possible by way of interchange of or combination with some or all of the described or illustrated elements. Wherever convenient, the same reference numbers will be used throughout the drawings to refer to same or like parts.

Image compositing may be utilized to document a variety of activities (e.g., skiing, playing team sports, executing various moves in space and time. A composite image may be obtained using a variety of methodologies, including those described in U.S. Provisional Patent Application Ser. No. 62/233,882, entitled "Automatic Composition of Composite Images and Videos From a Single Video or Image Sequence," filed Sep. 28, 2015, the foregoing being incorporated herein by reference in its entirety. A composite image, e.g., such as shown in FIG. 5C, may include a background and multiple representations of an object (e.g., person) at different locations in the foreground throughout the image frame. Multiple representations of the object at different locations in the foreground may include representations captured at different points in time. The composite image may be obtained from a sequence of images. The image sequence may be obtained using image acquisition burst mode wherein a given number (e.g., between 30 and 200) of multiple still images may be acquired over a given interval (e.g., 0.5 s and 10 s). In some implementations, the image sequence may be obtained using a video acquisition mode wherein a video clip of a given duration (e.g., between 1 s and 10 s) may be acquired at a given frame rate (e.g., between 15 fps and 240 fps). It will be recognized by those skilled in the arts that values provided herein characterizing a number of images, image duration, image resolution, and/or other image acquisition parameters are exemplary and serve to illustrate principles of the disclosure. Image capture parameters may be configured in accordance with specifics of a given application, e.g., longer image acquisition intervals may be associated with longer inter-image durations (lower frames per second), faster activities may be associated with shorter acquisition intervals and higher fps rates.

Figure 1A:
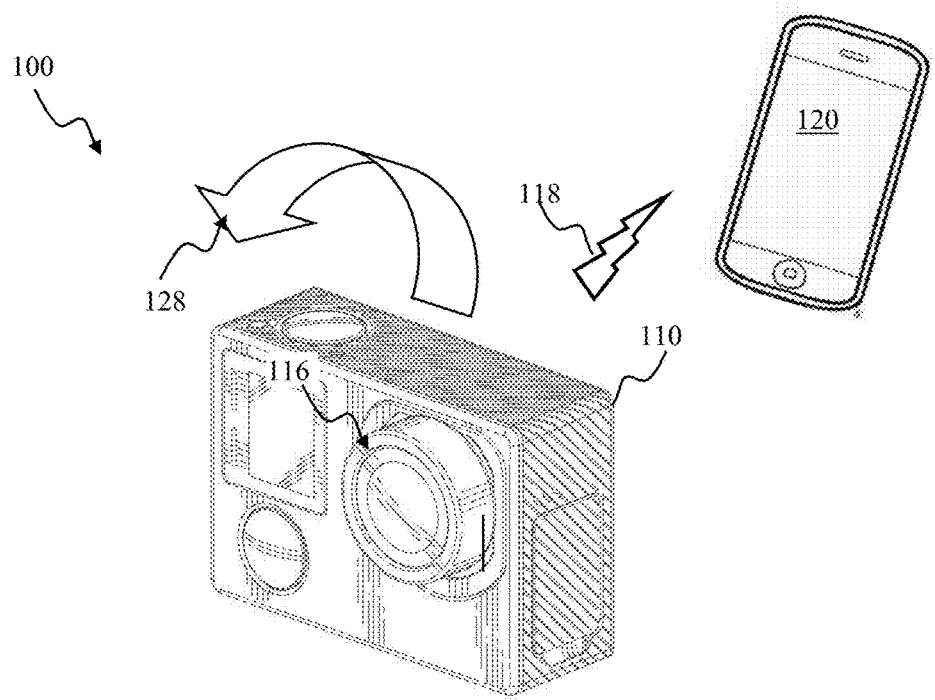
FIG. 1A is a diagram illustrating a system for content capture and image compositing in accordance with one implementation.
Figure 1B:
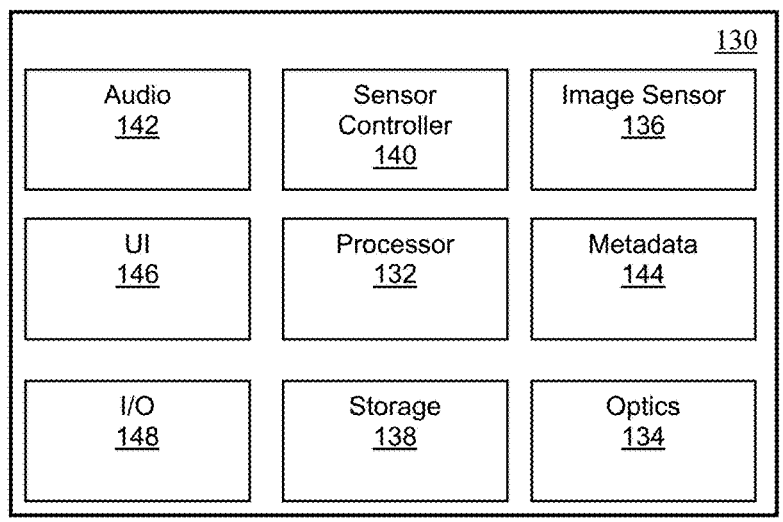
FIG. 1B is a functional block diagram illustrating a capture device for use with, e.g., system of FIG. 1A in accordance with one implementation.

Images may be acquired using a variety of image capture devices and/or systems including those shown and described with respect to FIGS. 1A-1B. FIG. 1A illustrates an exemplary capture system configured for acquiring image content, in accordance with one implementation. The system 100 of FIG. 1A may include a capture apparatus 110, e.g., such as GoPro activity camera, e.g., HER04 Silver, and/or other image capture devices.

The capture apparatus 110 may comprise a video camera device, such as described in, e.g., U.S. patent application Ser. No. 14/920,427 entitled "APPARATUS AND METHODS FOR EMBEDDING METADATA INTO VIDEO STREAM" filed on Oct. 22, 2015, the foregoing being incorporated herein by reference in its entirety.

The capture apparatus 110 may be configured to obtain imaging content (e.g., images and/or video). The capture apparatus 110 may include an optical element 116 (e.g., a lens) characterized by a field of view, e.g., 120° in longitudinal dimension and 90° in latitudinal dimension. In some implementations, the optical element may be characterized by what is referred to as fisheye pattern and produce images characterized by fish eye (or near-fish eye) field of view (FOV). The optical element 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical elements.

The capture apparatus 110 may house one or more internal metadata sources, e.g., video, inertial measurement unit, global positioning system (GPS) receiver component and/or other metadata source. In some implementations, the capture apparatus 110 may comprise a device described in U.S. patent application Ser. No. 14/920,427, entitled "APPARATUS AND METHODS FOR EMBEDDING METADATA INTO VIDEO STREAM" filed on Oct. 22, 2015, incorporated supra.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 110 may include one or more microphones configured to provide audio information that may be associated with images being acquired by the image sensor.

The capture apparatus 110 may be interfaced to an external metadata source (e.g., GPS receiver, cycling computer, metadata puck, and/or other device configured to provide information related to system 100 and/or its environment) via a remote link. The capture apparatus 110 may interface to a user interface device 120 via the link 118. In some implementations, the user interface device 120 may correspond to a smartphone, a tablet computer, a phablet, a smart watch, a portable computer, and/or other device configured to receive user input and communicate information with the capture apparatus 110. In some implementation, the capture apparatus 110 may be configured to provide panoramic content (or portion thereof) to the user interface device 120 for viewing.

In one or more implementations, the links 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, link 118 may be effectuated using a wired interface, e.g., HDMI, USB, digital video interface, display port interface (e.g., digital display interface developed by the Video Electronics Standards Association (VESA), Ethernet, Thunderbolt), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies, including those described in U.S. patent application Ser. No. 14/920,427 entitled "APPARATUS AND METHODS FOR EMBEDDING METADATA INTO VIDEO STREAM" filed on Oct. 22, 2015, incorporated supra.

The user interface device 120 may operate one or more software applications (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the user interface device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the user interface device 120 to view content acquired by the capture apparatus 110. During content capture for obtaining image composites, a user may rotate (sweep) the capture apparatus 110 through an arc in space (as illustrated by arrow 128 in FIG. 1A). The apparatus 110 may acquire and store orientation information of the imaging sensor during image capture.

The capture apparatus 110 may include a display configured to provide information related to camera operation mode (e.g., image resolution, frame rate), capture mode (sensor, video, photo), connection status (e.g., connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture.

User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

FIG. 1B illustrates one implementation of a camera apparatus for capturing audiovisual content and metadata. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics components. In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensors. The image sensor 136 may be configured to capture light waves gathered by the optics module 134 and to produce image(s) data based on control signals from the sensor controller module 140. Optics module 134 may comprise focus controller configured to control the operation and configuration of the lens. The image sensor 136 may be configured to generate an output signal conveying visual information regarding an object. The visual information may include, by way of non-limiting example, one or more of an image, a video, and/or other visual information. The optical module 134, and the image sensor 136 may be embodied in a housing.

In some implementations, the image sensor 136 may include, without limitation, one or more of video sensors, audio sensors, capacitive sensors, radio sensors, vibrational sensors, ultrasonic sensors, infrared sensors, radar sensors, LIDAR sensors and/or sonar sensors, and/or other sensory devices.

The capture device 130 may include one or more audio components (e.g., microphone(s) embodied within the camera (e.g., 142)). Microphones may provide audio content information.

The capture device 130 may include a sensor controller module 140. The sensor controller module 140 may be used to operate the image sensor 136. The sensor controller module 140 may receive image or video input from the image sensor 136; audio information from one or more microphones, such as 142. In some implementations, audio information may be encoded using e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www.digitalbrainstorming.ch/db_data/eve/ambisonics/text01.pdf, the foregoing being incorporated herein by reference in their entirety.

The capture device 130 may include one or more metadata modules embodied (e.g., 144) within the camera housing and/or disposed externally to the camera. The processor 132 may interface to the sensor controller module 140 and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content.

Metadata module 144 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the capture device 130, the GPS sensor may provide GPS coordinates, time, identifying the location of the capture device 130; and the altimeter may obtain the altitude of the capture device 130. In some implementations, internal metadata module 144 may be rigidly coupled to the capture device 130 housing such that any motion, orientation or change in location experienced by the capture device 130 is also experienced by the metadata sensors 144. The sensor controller module 140 and/or processor 132 may be operable to synchronize various types of information received from the metadata sources. For example, timing information may be associated with the sensor data. Metadata information may be related to content (photo/video) captured by the image sensor 136.

In some implementations, the metadata captured may be decoupled from video/image capture. That is, metadata may be stored before, after, and in-between one or more video clips and/or images. In one or more implementations, the sensor controller module 140 and/or the processor 132 may perform operations on the received metadata to generate additional metadata information. For example, the processor 132 may integrate the received acceleration information to determine the velocity profile of the capture device 130 during the recording of a video. In some implementations, video may consist of multiple frames of pixels using any applicable encoding method (e.g., H262, H.264, Cineform and/or other standards).

The capture device 130 may include electronic storage 138. The electronic storage 138 may comprise a system memory module configured to store executable computer instructions that, when executed by the processor 132, perform various camera functionalities including those described herein. The electronic storage 138 may comprise storage memory configured to store content (e.g., metadata, images, audio) captured by the capture device 130.

The electronic storage 138 may include non-transitory memory configured to store configuration information and/or processing code configured to enable, e.g., video capture, metadata capture and/or to produce a multimedia stream comprised of, e.g., an audio track, a video track, and/or metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the capture device 130. The processor 132 may interface to the sensor controller module 140 in order to obtain and process sensory information for, e.g., object detection, face tracking, stereo vision, and/or other tasks.

The processor 132 may interface with mechanical units, electrical units, sensory units, power units, and/or user interface module 146 via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The capture device 130 may include user interface (UI) module 146. The UI module 146 may comprise any type of device capable of registering inputs from and/or communicating outputs to a user. These may include, without limitation, display devices, touch devices, proximity sensitive interface devices, light devices, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the capture device 130.

The capture device 130 may include an input/output (I/O) interface module 148. The I/O interface module 148 may be configured to synchronize the capture device 130 with other cameras and/or with other external devices, such as a remote control, a second capture device, a smartphone, a user interface device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., device 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source.

The communications interface of the capture device 130 may include one or more connections to external computerized devices to allow for, inter alia, configuration and/or management of remote devices e.g., as described above with respect to FIG. 1A and/or FIG. 1B. The connections may include any of the wireless or wireline interfaces discussed above, and further may include customized and/or proprietary connections for specific applications. In some implementations, the communications interface may comprise a component (e.g., a dongle), comprising an infrared sensor, a radio frequency antenna, ultrasonic transducer, and/or other communications interfaces. In one or more implementations, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The capture device 130 may include a power system that may be tailored to the needs of the application of the device. For example, for a small-sized lower power action camera, a wireless power solution (e.g. battery, solar cell, inductive (contactless) power source, rectification, and/or other) may be used.

FIGS. 2A-2B, 3A-3B, 4A-4B include graphical illustrations depicting exemplary user interface for acquiring content for image compositing. In some implementations, the user interface may be displayed on a user interface device, e.g., such as user interface device 120 shown in FIG. 1A.

Figure 2A:
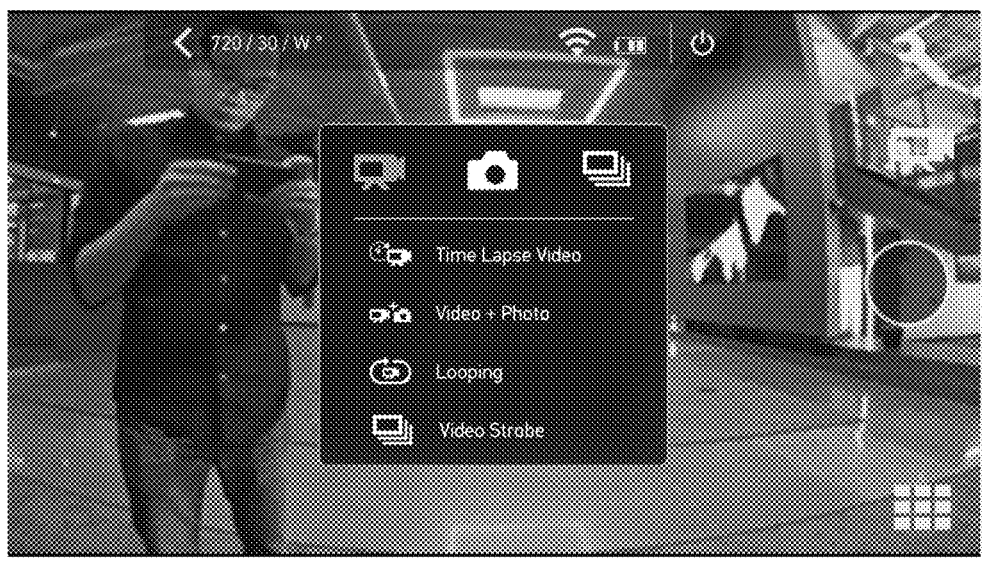
FIGS. 2A-2B are graphical illustrations depicting user interface for acquiring content for image compositing in accordance with one implementation.

As shown in FIG. 2A, the user interface may provide one or more fields related to one or more image acquisitions modes (e.g., Time Lapse Video, Video+Photo, Looping, Video Strobe, etc.) of operating a capture device. In some implementations, Video Strobe mode may correspond to a mode for image compositing (compositing image acquisition mode). In some implementations, Video Strobe mode may include acquisition of content for image compositing and image compositing of captured images. Responsive to receiving a selection of the field related to the compositing image acquisition mode, one or more instructions may be communicated to a capture device (e.g., via a wireless communications interface). The instruction(s) may be configured to cause the capture device to acquire a sequence of images and/or composite two of more of the acquired images. Other modes and names of modes for image compositing are contemplated.

Figure 2B:
Figure 3A:
FIGS. 3A-3B are graphical illustrations depicting user interface for acquiring content for image compositing in accordance with one implementation.
Figure 3B:

As shown in FIG. 2B, the user interface may provide one or more instructions for image compositing and/or other operations. For example, the user interface may provide an instruction for a user to press the start button on the user interface to begin image compositing (e.g., acquiring a sequence of images and compositing two or more of the acquired images). Other instructions and other modes of operation are contemplated.

Figure 4A:
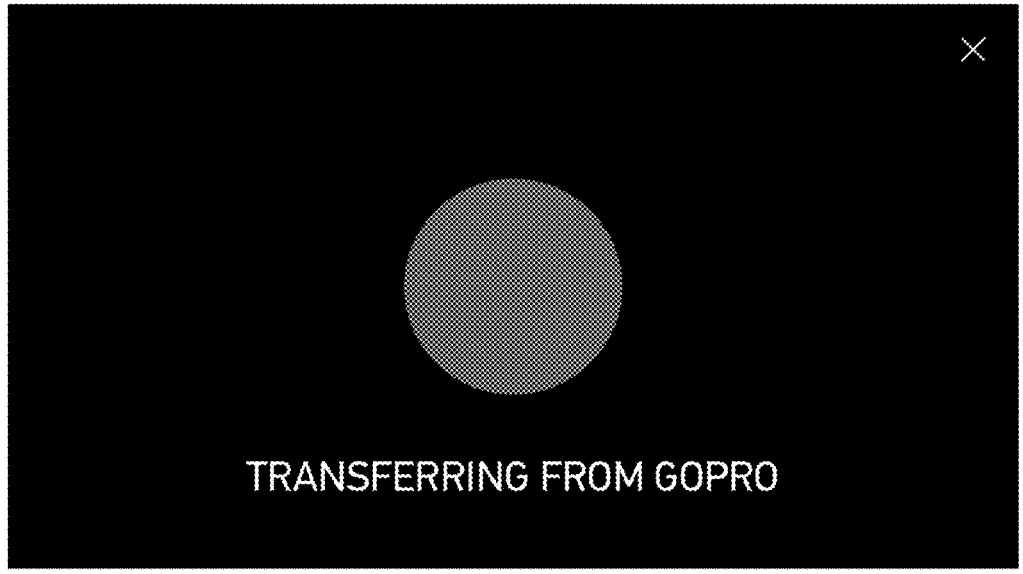
FIGS. 4A-4B are graphical illustrations depicting user interface for acquiring content for image compositing in accordance with one implementation.
Figure 4B:
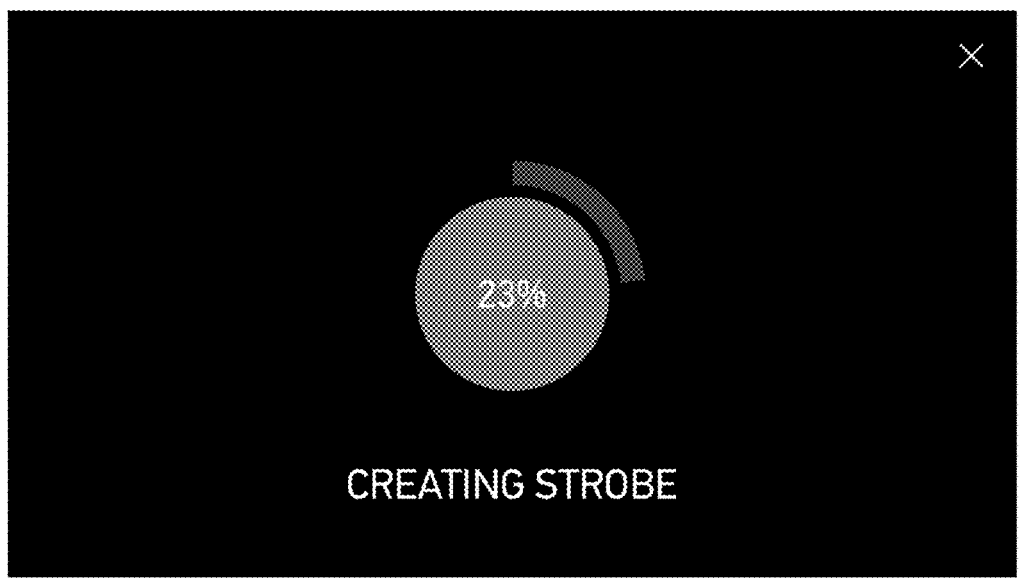

As shown in FIGS. 3A-3B, 4A-4B, the user interface may provide information regarding content acquisition, image compositing, and/or other operations. For example, the user interface may provide one or more of a text, an icon, an image, a number or other visually perceptible information that represent one or more aspects of image capture, image compositing, and/or other operations. For example, the numbers displayed in the user interface in FIGS. 3A-3B may correspond to number of images acquired, the duration of image acquisition (e.g., in seconds, etc.), and/or other information. As another example, the text shown in FIG. 4A may indicate that a capture device (e.g., a GoPro activity camera) is transferring information (e.g., captured images) to another device (e.g., user interface 120 shown in FIG. 1A). As another example, the text shown in FIG. 4B may indicate that the captured images are being segmented and composited to create one or more composite images. As shown in FIG. 4B, the user interface may include text and/or other visual representations indicating the progress of an operation.

Figure 5A:
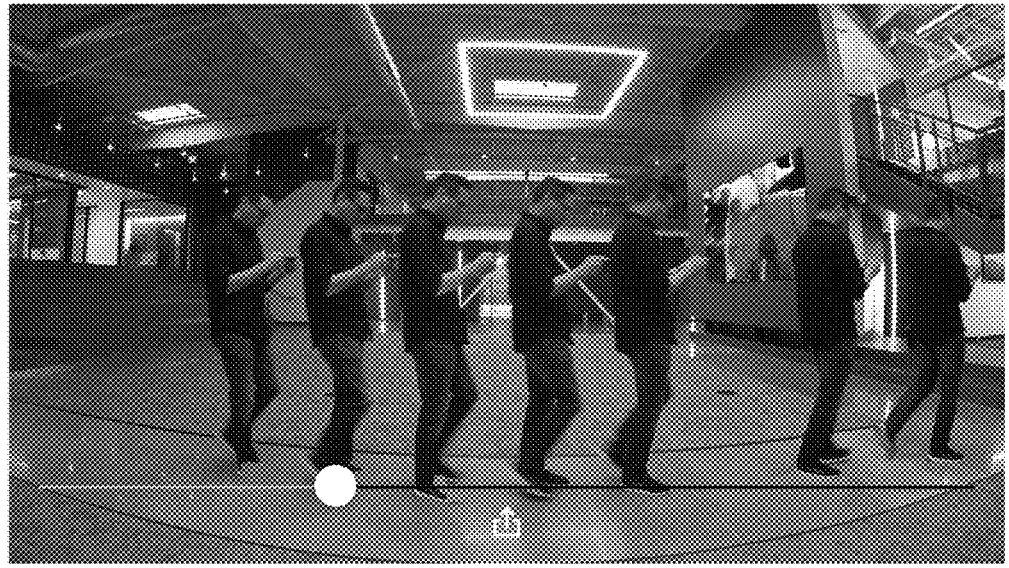
FIGS. 5A-5C are graphical illustrations depicting a user interface for selecting and/or sharing of composite images in accordance with one implementation.
Figure 5B:
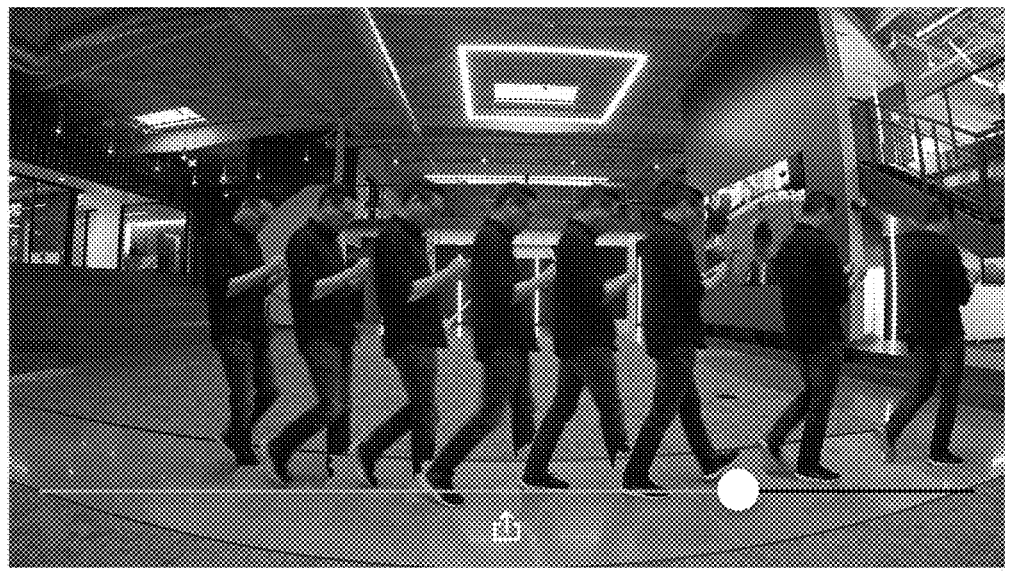
Figure 5C:
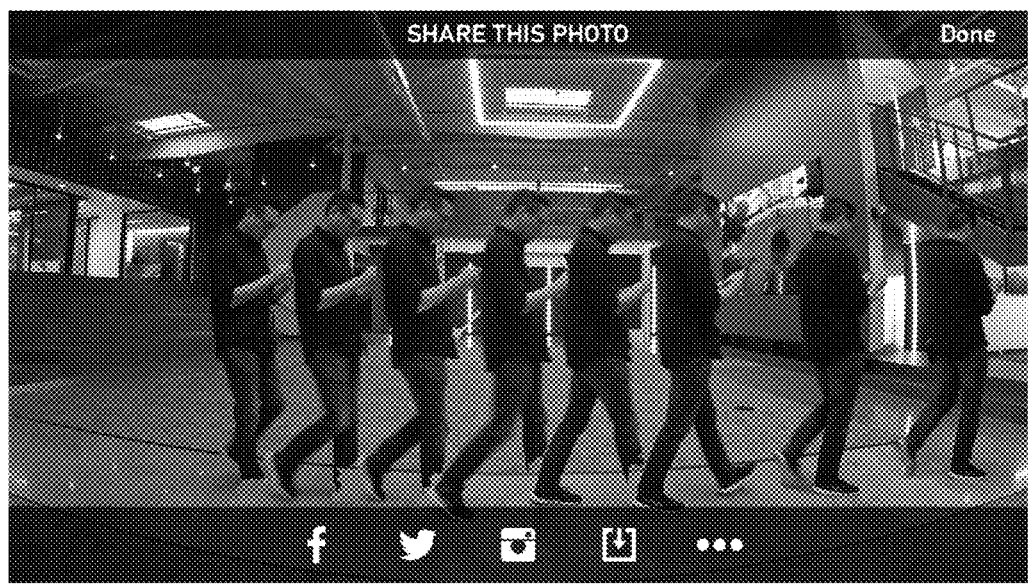

FIGS. 5A-5B illustrate exemplary user interface for selecting composite images. For example, a slider element shown in the lower portion of the user interface may correspond to one or more parameters for configuring composite images, and the solid circle on the slider element may correspond to a user selection of the one or more parameters for configuring composite images. For example, individual ones of the captured images (e.g., two or more images from the sequence of images) may include a representation of an object captured at different points in time. Individual composite images may include multiple representations of the object captured at different points in time. The slider element may represent the amount of overlap between multiple representations of the object captured at different points in time in the composite images. The solid circle on the left side of the slider element (as shown in FIG. 5A) may correspond to a smaller amount of overlap than the solid circle on the right side of the slider element (as shown in FIG. 5B). Smaller overlap may result in a fewer number of representations of the object in the composite image (e.g., seven representations of the object shown in FIG. 5A, compared to eight representations of the object shown in FIG. 5B). Placing the sold circle on the slider element may enable a user to (1) generate one or more composite images based on a given overlap amount between multiple representations of an object and/or select/view one or more composite images (previously) generated based on the given overlap amount between multiple representations of the object.

FIG. 5C illustrate an exemplary interface for sharing composite images. The composite image displayed in the user interface may correspond to the composite image selected by the user (e.g., via the slider element shown in FIGS. 5A, 5B). The user interface may provide context for the sharing operation via text "SHARE THIS PHOTO." The user interface may provide one or more user interface elements (fields) corresponding to one or more target destinations, such as an electronic storage, a server of a social network site (e.g., Facebook, Twitter, Instagram, etc.), a data server (e.g., Vimeo, Dropbox), and/or other destinations. Responsive to a user's selection of sharing the selected composite image(s), the selected composite image(s) may be communicated to one or more target destination via wired and/or wireless communications interface.

Figure 6:
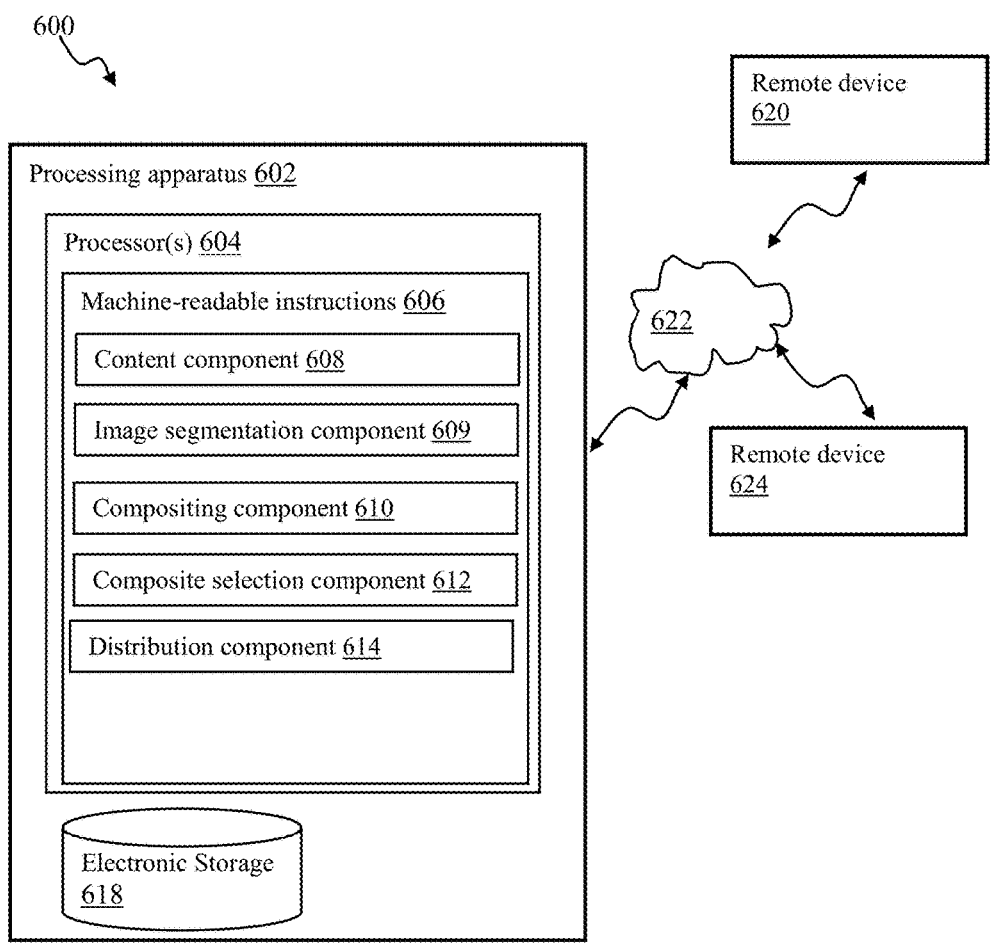
FIG. 6 is a functional block diagram illustrating a system for obtaining composite images using methodology of the disclosure in accordance with one implementation.

FIG. 6 illustrates a computerized system 600 for obtaining composite images using methodology of the disclosure in accordance with one implementation. The system 600 of FIG. 6 may include a processing apparatus 602 (e.g., including capture apparatus 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration. The processing apparatus 602 may include and/or be in operable communication with one or more displays.

The processing apparatus 602 may be in operable communication with one or more remote devices 620, 624 via one or more electronic communications interface 622. The electronic communications interface 622 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the electronic communications interface 622 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, electronic communications interface 622 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the electronic communications interface 622 may be represented using formats including one or more of hypertext markup language (HTML), extensible markup language (XML), and/or other formats. One or more exchanges of information between entities of system 600 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The remote devices 620, 624 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), and/or other device configured to communicate information with the processing apparatus 602. In some implementations, the system 600 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on Oct. 29, 2015, the foregoing being incorporated herein by reference in its entirety.

The processing apparatus 602 may include one or more physical processors 604 configured by machine-readable instructions 606 and/or other components. Executing the machine-readable instructions 606 may cause the one or more physical processors 604 to effectuate image compositing using methodology of the disclosure. The machine-readable instructions 606 may include one or more of content component 608, image segmentation component 609, compositing component 610, composite selection component 612, distribution component 614, and/or other components.

One or more features and/or functions of the processing apparatus 602 may facilitate content acquisition/access, image compositing, and/or composite image distribution.

The processing apparatus 602 may include electronic storage 618. The processing apparatus 602 may include communication lines or ports to enable the exchange of information with a network and/or other entities. Illustration of processing apparatus 602 in FIG. 6 is not intended to be limiting. The processing apparatus 602 may include a plurality of hardware, software, and/or firmware components operating together to provide the functionality attributed herein to processing apparatus 602. For example, the processing apparatus 602 may be implemented by a cloud of computing platforms operating together as processing apparatus 602.

Electronic storage 618 may comprise electronic storage media that electronically stores information. The electronic storage media of electronic storage 618 may include one or both of system storage that is provided integrally (i.e., substantially non-removable) with processing apparatus 602 and/or removable storage that is removably connectable to processing apparatus 602 via, for example, a port or a drive. A port may include a USB port, a Firewire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from processing apparatus 602, information received from external resource(s), and/or other information that enables processing apparatus 602 to function as described herein.

The system 600 may include an external resource(s) operatively linked via one or more electronic communication links 622. External resource(s) may include sources of information, hosts, and/or other entities outside of system 600, external entities participating with system 600, computing platforms, and/or other resources. In some implementations, some or all of the functionality attributed herein to system 600 may be provided by external resource(s).

It will be appreciated that this is not intended to be limiting and that the scope of this disclosure includes implementations in which processing apparatus 602, external resources, and/or other entities may be operatively linked via some other communication media.

Processor(s) 604 may be configured to provide information-processing capabilities in processing apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within the same device, or processor 604 may represent processing functionality of a plurality of devices operating in coordination. The processor 604 may be configured to execute components 608, 609, 610, 612, and/or 614. Processor 604 may be configured to execute components 608, 609, 610, 612, and/or 614 by software; hardware; firmware; some combination of software, hardware, and/or firmware; and/or other mechanisms for configuring processing capabilities on processor 604.

It should be appreciated that although components 608, 609, 610, 612, and/or 614 are illustrated in FIG. 6 as being co-located within a single processing unit, in implementations in which processor 604 includes multiple processing units, one or more of components 608, 609, 610, 612, and/or 614 may be located remotely from the other components. The description of the functionality provided by the different components 608, 609, 610, 612, and/or 614 described above is for illustrative purposes and is not intended to be limiting, as any of components 608, 609, 610, 612, and/or 614 may provide more or less functionality than is described. For example, one or more of components 608, 609, 610, 612, and/or 614 may be eliminated, and some or all of its functionality may be provided by other ones of components 608, 609, 610, 612, and/or 614 and/or other components. As an example, processor 604 may be configured to execute one or more additional components that may perform some or all of the functionality attributed below to one of components 608, 609, 610, 612, and/or 614.

In FIG. 6, the content component 608 may be configured to access, acquire, and/or manage image, video and/or audio content. In some implementations, the content component 608 may be configured to effectuate image/video/audio content acquisition using any applicable methodologies including those described herein. By way of an illustration, the content component 608 may be operable to instantiate content acquisition by, e.g., the capture apparatus 110 of FIG. 1A, based on a timer event, user instruction, or a sensor event. In one or more implementations, the content component 608 may be operable effectuate content acquisition via user interface, e.g., such as shown in FIG. 2A. In some implementations, the content component 608 may be operable to access previously acquired content (e.g., a sequence of images) from electronic storage 618 and/or external resource (e.g., external storage, and/or remote user device during content upload). The operations performed by the content component 608 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on Oct. 22, 2015, incorporated supra, and/or in a session container (e.g., such as described in detail in U.S. patent application Ser. No. 15/001,038, entitled "METADATA CAPTURE APPARATUS AND METHODS" filed on Jan. 19, 2016, the foregoing being incorporated herein by reference in its entirety).

In FIG. 6 the image segmentation component 609 may be configured to effectuate segmentation of one or more individual images of the image/video content, e.g., using methodology described herein. For example, the image partitioning component 608 may segment one or more images into a foreground portion and a background portion. For example, two or more images in the sequence of images may individually include a representation of an object captured at different points in time. The image partitioning component 608 may segment the images including the representation of the object into a foreground portion (including the representation of the object) and a background portion (not including the representation of the object). The image segmentation component 609 may identify multiple representations of the object in the foreground portions of two or more images.

In FIG. 6 the compositing component 610 may be configured to obtain one or more composite images, e.g., such as shown in FIGS. 5A-5B, based on the segmented images. The compositing component 610 may generate one or more composite images based on one or more of the background portions of the multiple representations of the object in the foreground portions of two or more images. Individual ones of the composite image(s) may include multiple representations of the object captured at different points in time. One or more of the generated composite images may be presented on a display (e.g., via a user interface as disclosed herein).

In FIG. 6, composite selection component 612 may be configured to receive selection of one or more composite images. Composite selection component 612 may receive selection of one or more composite images via user interface, e.g., such as shown in FIGS. 5A-5B.

In FIG. 6, the distribution component 614, may be configured to provide one or more composite images. One or more composite images may be the one or more composite images selected via composite selection component 612. The distribution component 614 may provide one or more composite images to a target destination via a wired and/or wireless communications interface. A target destination may include one or more of client devices (e.g., the remote device 620, 624 (e.g., smartphone) and/or external resource (e.g., cloud storage)), and/or other target destinations.

Figure 7A:
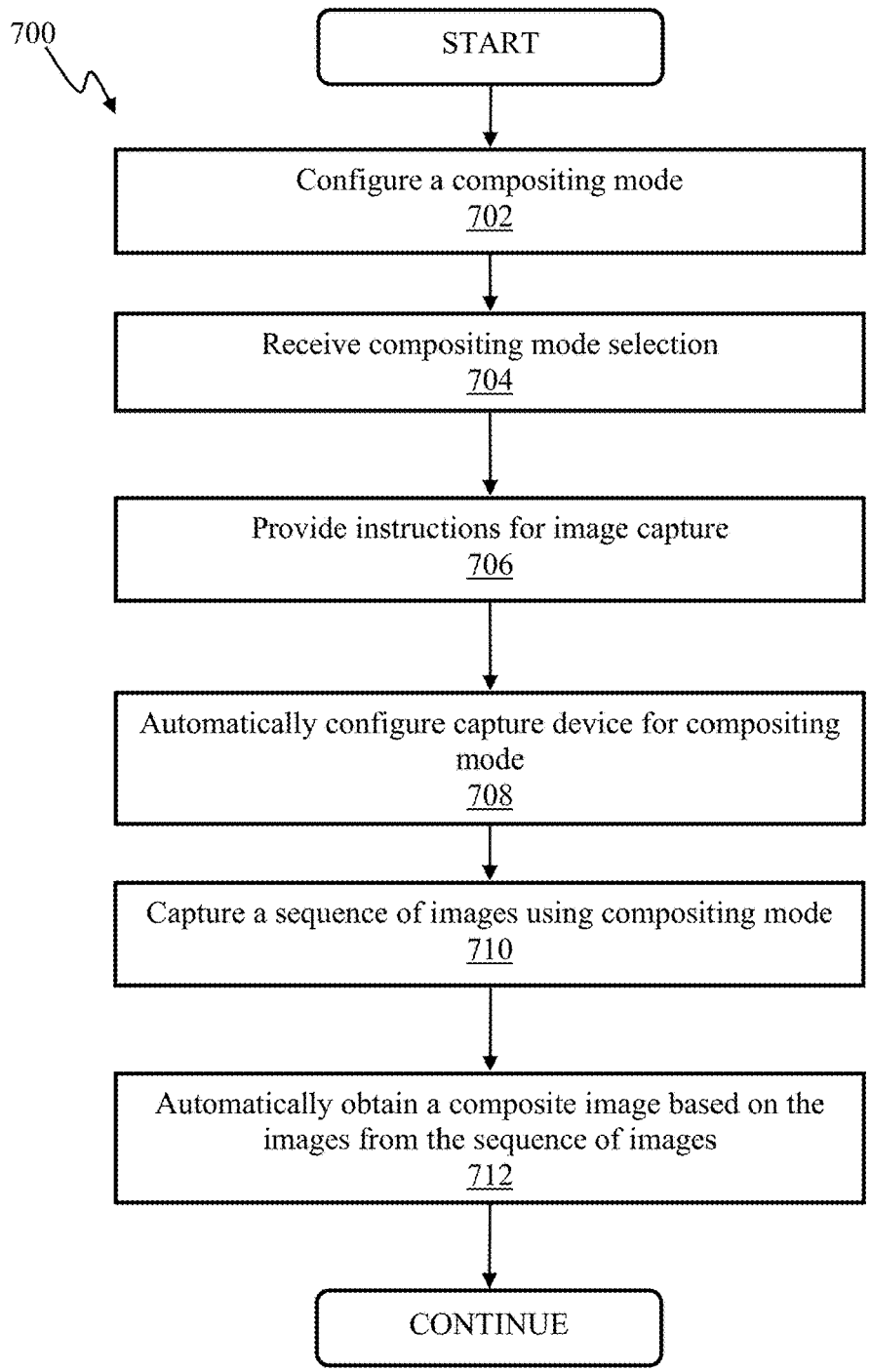
FIG. 7A is logical flow diagram illustrating a method of configuring an image capture device for image compositing in accordance with one.
Figure 7B:
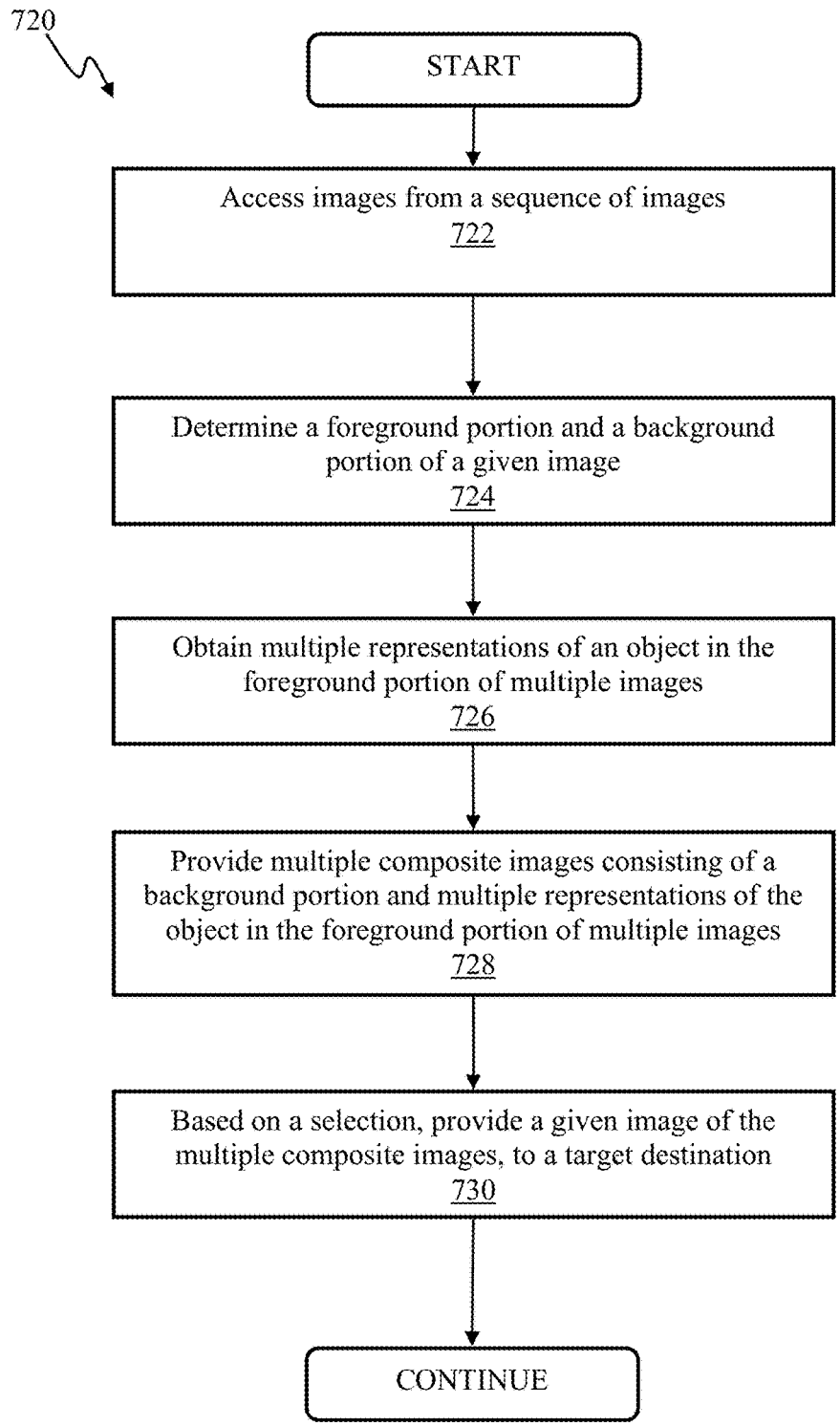
FIG. 7B is logical flow diagram illustrating a method of image compositing in accordance with one implementation.

FIGS. 7A-7B illustrate methods 700, 720 for compositing image in accordance with some implementations of the present disclosure. The operations of methods 700, 720 presented below are intended to be illustrative. In some implementations, methods 700, 720 may be accomplished with one or more additional operations not described, and/or without one or more of the operations discussed. Additionally, the order in which the operations of methods 700, 720 are illustrated in FIGS. 7A-7B and described below is not intended to be limiting.

In some implementations, methods 700, 720 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 720 in response to instructions stored electronically on an electronic storage medium. The one or more processing devices may include one or more devices configured through hardware, firmware, and/or software to be specifically designed for execution of one or more of the operations of methods 700, 720. Operations of methods 700, 720 may be effectuated by one or more devices and/or computerized systems including these described with respect to FIGS. 1A-1B and/or FIG. 6.

FIG. 7A illustrates a method of configuring an image capture device for image compositing in accordance with one implementation of the present disclosure.

At operation 702 of method 700, a compositing mode may be configured. In some implementation, the compositing mode configuration may be effectuated by providing operational code for a capture device (e.g., camera firmware) that may include image compositing mode of image capture. In one or more implementation the compositing mode configuration may be effectuated by providing an application operable by a user interface device (e.g., mobile app) that may include image compositing mode of image capture.

At operation 704, an indication of a compositing mode selection may be obtained. In some implementations, the compositing mode selection indication may be effectuated based on activation of a GUI element of a graphical user interface (e.g., such as shown and described with respect to FIG. 2A).

At operation 706, instructions for image capture may be provided. In some implementation, the instructions may include one or more of on-screen instructions, audio instructions, a combination thereof, and/or other means of communicating instructions.

At operation 708, of method 700, based on the selection of the compositing mode, a capture device may be automatically configured for compositing mode image acquisition. In some implementations, the configuring the capture device may include configuring image composition acquisition setting, which include one or more of configuring image capture duration, number of captured images, inter-image interval, shutter speed, image resolution, and/or other parameters. In some implementations, one or more options for configuring the capture device may be presented in a user interface for selection by a user.

At operation 710, a sequence of images may be acquired. Image acquisition may be effectuated using the image compositing acquisition setting (e.g., image capture duration, number of captured images, inter-image interval, shutter speed, image resolution) configured at operation 708.

At operation 712, a composite image may be automatically obtained based on two or more images from the sequence of images. In some implementations, the composite image may be generated by operating computer executable instructions by a processor of a capture device (e.g., processor 132 of the capture device 130 in FIG. 1B). In one or more implementations, the composite image may be generated by operating computer executable instructions by a processor of a user interface device (e.g., an app operable by a smartphone) such as user interface device 120 of FIG. 1A.

FIG. 7B illustrates a method for image compositing in accordance with one implementation of the present disclosure.

At operation 722 of method 720, images from a sequence of images may be accessed. In some implementations, the sequence of images may correspond to images acquired at operation 710 of method 700. In some implementations, accessing the sequence of images may include communicating to a capture device one or more instructions configured to cause the capture device to acquire the sequence of images and obtaining the sequence of images from the capture device.

At operation 724, a foreground portion and/or a background portion of a given image may be determined. In some implementations, image segmentation operation may be effectuated using methodology described in U.S. Provisional Patent Application Ser. No. 62/233,882, entitled "Automatic Composition of Composite Images and Videos From a Single Video or Image Sequence," filed Sep. 28 2015, incorporated supra.

At operation 726, multiple representations of an object in the foreground portion of multiple images may be obtained. In some implementations, object representations may correspond to an image of a person, e.g., such as shown in FIGS. 5A-5C.

At operation 728, multiple composite images consisting of one or more background portions and multiple representations of the object from two or more of the foreground portions may be provided. Multiple representations of the object may be obtained by analyzing the foreground portion of a given image of the multiple images. In some implementations, individual ones of the multiple composite images may correspond to a time instant for a given image of the sequence of images (e.g., instant associated with the image 5A or image 5B). In one or more implementations, individual ones of the multiple composite images may be configured based on a given amount of overlap between individual object representations. By way of an illustration, composite image of FIG. 5A may be characterized by a smaller amount of overlap (indicated by position of a solid circle on the slider element) compared to object overlap of the image in FIG. 5B. Smaller overlap may result in fewer number of representations of the object (e.g., as shown in FIG. 5A compared to number of representations of the object in FIG. 5B). In some implementations, multiple composite images may be generated based on different overlap amounts between the multiple representations of the object and a user may select to view one or more of the composite images (e.g., by moving a solid circle on the slider element shown in FIGS. 5A, 5B). In some implementations, a composite image may be generated based on a given amount of overlap selected by a user (e.g., by moving a solid circle on the slider element shown in FIGS. 5A, 5B).

At operation 730, based on a selection indication, a given composite image of the multiple composite images may be provided to a target destination. In some implementations, the indication may be effectuated based on a user positioning the slider in FIG. 5A-5B at a target position, user selecting a graphical user interface element (e.g., save, share button), and/or other actions. In one or more implementations, the target destination may include an electronic storage, a server of a social network site (e.g., Facebook), a data server (e.g., Vimeo, Dropbox), and/or other destination.

Image acquisition and/or manipulation methodology described herein may provide for a system configured to obtain image composites. In some implementations, image capture and/or manipulation may be enabled via an on-camera mode (also referred to as "hard mode"), wherein camera operating software (also referred to as firmware) may be modified to include one or more processes for configuring image capture, image acquisition, and/or image processing to produce a composite image. In one or more implementations, image compositing may be effectuated via an off-camera mode (also referred to as "soft mode"), wherein an application (e.g., GoPro mobile app) may be operable to include one or more processes for configuring image capture parameters, communicating image capture parameters to a capture device (e.g., camera), providing guidance to a user (e.g., on screen prompts, audio prompts, and/or other guidance) during image acquisition, transferring of images from the camera, and/or analysis of the captured images to produce a composite image.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLABT™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "transmission channel", "delay line", "wireless link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnetT™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A system for image compositing, the system comprising:
    one or more physical processors configured by machine readable instructions to:
        effectuate presentation of a user interface on a display, the user interface including one or more fields related to one or more image acquisition modes, the one or more image acquisition modes including a compositing image acquisition mode, the one or more fields including a compositing image acquisition mode field related to the compositing image acquisition mode;
        responsive to receiving a selection of the compositing image acquisition mode field, communicate to a capture device via a wireless communications interface one or more instructions configured to cause the capture device to acquire a sequence of images;
        obtain one or more composite images, the one or more composite images generated based on two or more images from the sequence of images, individual ones of the two or more images including a representation of an object captured at different points in time, individual ones of the one or more composite images including multiple representations of the object captured at different points in time, wherein the two or more images are selected based on (1) segmentation of the individual ones of the two or more images into (a) background portions, and (b) foreground portions including the multiple representations of the object, and (2) amounts of overlap between the multiple representations of the object within the foreground portions; and
        present one or more of the obtained composite images via the user interface.

2. The system of claim 1, wherein the one or more composite images are generated by the capture device.

3. The system of claim 1, wherein the one or more composite images are generated by the one or more physical processors.

4. The system of claim 1, wherein the one or more physical processors are further configured by the machine readable instructions to provide via the user interface one or more instructions related to operation of the capture device for acquiring the sequence of images.

5. The system of claim 1, wherein the one or more physical processors are further configured by the machine readable instructions to provide via the user interface one or more options configured to cause the capture device to capture the sequence of images, set a capture duration for the sequence of images, set a number of images within the sequence of images, set an inter-image interval, set a shutter speed, or set a resolution for the sequence of images.

6. The system of claim 4, wherein the one or more instructions include an instruction to press a start button within the user interface to being image compositing.

7. The system of claim 1, wherein the one or more composite images include a first composite image and a second composite image, the first composite image generated based on a first overlap amount between the multiple representations of the object and the second composite image generated based on a second overlap amount between the multiple representations of the object, the first overlap amount being different from the second overlap amount.

8. The system of claim 6, wherein the user interface presented on the display includes a slider, the slider including a bar with a first end and a second end opposite the first end, the slider enabling user selection of a given overlap amount between the multiple representations of the object based on positioning of an element along the bar between the first end and the second end.

9. The system of claim 8, wherein responsive to user selection of a first overlap amount between the multiple representations of the object, a first composite image is generated based on the first overlap amount between the multiple representations of the object.

10. The system of claim 8, wherein responsive to user selection of a first overlap amount between the multiple representations of the object, a first composite image is presented via the user interface, the first composite image generated based on the first overlap amount between the multiple representations of the object.

11. The system of claim 1, wherein the sequence of images are video frames of a video clip acquired by the capture device.

12. The system of claim 1, wherein the one or more physical processors are further configured by the machine readable instructions to communicate one or more of the obtained composite images to a target destination via the wireless communications interface.

13. A user interface device, comprising:
a display;
a wireless communications interface;
one or more physical processors in operable communications with the display and the wireless communications interface, the one or more physical processors configured by computer-executable instructions to:
effectuate presentation of a user interface on the display, the user interface including one or more fields related to one or more image acquisition modes, the one or more image acquisition modes including a compositing image acquisition mode, the one or more fields including a compositing image acquisition mode field related to the compositing image acquisition mode;
responsive to receiving a selection of the compositing image acquisition mode field, access a sequence of images;
determine a foreground portion and a background portion for two or more images of the sequence of images;
identify multiple representations of an object in the foreground portions of the two or more images;
generate one or more composite images based on one or more of the background portions and the multiple representations of the object in the foreground portions of the two or more images, wherein the multiple representations of the object are identified for use in generating the one or more composite images based on amounts of overlap between the multiple representations of the object within the foreground portions;
effectuate presentation on the display one or more of the generated composite images;
receive a selection of at least one of the generated composite images for sharing; and
provide the selected composite image to a target destination via the wireless communications interface.

14. The user interface device of claim 13, wherein accessing the sequence of images includes accessing previously acquired images.

15. The user interface device of claim 13, wherein accessing the sequence of images includes:
communicating to a capture device one or more instructions configured to cause the capture device to acquire the sequence of images; and
obtaining the sequence of images from the capture device.

16. The user interface device of claim 13, wherein the one or more composite images are generated further based on a given overlap amount between the multiple representations of the object.

17. The user interface device of claim 16, wherein the one or more composite images include a first composite image and a second composite image, the first composite image generated based on a first overlap amount between the multiple representations of the object and the second composite image generated based on a second overlap amount between the multiple representations of the object, the first overlap amount being different from the second overlap amount.

18. The user interface device of claim 16, wherein the one or more physical processors are further configured by computer-executable instructions to effectuate presentation of the display a slider, the slider including a bar with a first end and a second end opposite the first end, the slider enabling user selection of the given overlap amount between the multiple representations of the object based on positioning of an element along the bar between the first end and the second end.

19. The user interface device of claim 18, wherein responsive to user selection of a first overlap amount between the multiple representations of the object, a first composite image is generated based on the first overlap amount between the multiple representations of the object.

20. The user interface device of claim 18, wherein responsive to user selection of a first overlap amount between the multiple representations of the object, a first composite image is presented on the display, the first composite image generated based on the first overlap amount between the multiple representations of the object.

* * * * *